United States Patent

Grohe et al.

[11] Patent Number: 5,960,828
[45] Date of Patent: Oct. 5, 1999

[54] SANITARY FITTING

[75] Inventors: Klaus Grohe, Schiltach; Werner Lorch, Schramberg, both of Germany

[73] Assignee: Hans Grohe GmbH & Co. KG, Germany

[21] Appl. No.: 08/941,680

[22] Filed: Sep. 30, 1997

[51] Int. Cl.$^6$ ...................................................... F16K 11/06
[52] U.S. Cl. ......................... 137/607; 137/597; 236/12.11
[58] Field of Search ...................................... 137/597, 607; 236/12.11

[56] References Cited

U.S. PATENT DOCUMENTS

| | | | |
|---|---|---|---|
| 3,840,046 | 10/1974 | Busquets | 137/549 |
| 4,444,215 | 4/1984 | Zukansky | 137/597 X |
| 5,111,846 | 5/1992 | Hochstrasser et al. | 137/607 |
| 5,205,482 | 4/1993 | Ems | 236/12.1 |
| 5,370,305 | 12/1994 | Schneider | 236/12.2 |
| 5,494,077 | 2/1996 | Enoki et al. | 137/625.17 |

FOREIGN PATENT DOCUMENTS

| | | |
|---|---|---|
| 0246405 | 3/1987 | European Pat. Off. . |
| 0246405 | 11/1987 | European Pat. Off. . |
| 3419208 | 5/1984 | Germany . |
| 4120024 | 6/1991 | Germany . |
| 4423853 | 7/1994 | Germany . |
| 4423853 | 1/1996 | Germany . |

OTHER PUBLICATIONS

PCT/DE90/00059 (WO 91/08532) Tap Water Mixer Unit—Ideal Standard GmbH.

*Primary Examiner*—Stephen M. Hepperle
*Attorney, Agent, or Firm*—Duane, Morris & Heckscher LLP

[57] ABSTRACT

A sanitary fitting contains in a common basebody thereof a flow control valve and a thermostatic valve. The flow control valve contains a valve for the cold water and a valve for the hot water. These valves are arranged upstream of the thermostatic valve in the direction of flow. Both valves are actuated by a common control valve. In addition, the flow control valve may be used for selecting several outlets.

15 Claims, 2 Drawing Sheets

SANITARY FITTING

TECHNICAL FIELD AND BACKGROUND OF THE INVENTION

The invention is based on a sanitary fitting including a mixer valve, more particularly, a thermostat.

Thermostatic valves have two actuating elements, namely one element for adjusting the temperature with the aid of the thermostat and a second actuating element for opening and closing the valve leading to the discharge. In this arrangement it is often so that the thermostat is set once only, it then remaining always at the same temperature for a long time.

For selecting water discharge, for example between a bathtub tap and a hand shower a further actuating element is usually provided which may be applied to the fitting itself or also remote therefrom.

To simplify use thereof it is already known (EP-A-246 405) to configure a sanitary fitting so that the flow control valve which controls the amount of mixed water coming from the thermostat is also used for selecting the two discharge points. In this case, however, there is a crossflow risk, i.e. water gaining access, for example, from the cold water pipe into the hot water pipe. To prevent this happening backflow preventers need to be inserted upstream of the thermostatic valve.

It is also known to arrange a separate shutoff valve for each hot and cold water pipe upstream of a thermostat and to actuate the two separate shutoff valves via a common positioning control element. However, since the two shutoff valves cannot be precisely tuned to each other a slipping clutch needs to be incorporated between the common actuating element and each of the two shutoff valves. This may result in the user experiencing a significantly increased resistance in a certain position when closing the valve, prompting him to wrongly assume that the valve is closed. Instead, this increased resistance merely signifies that one of the two valves is closed whilst the other is still open.

SUMMARY OF THE INVENTION

The invention is based on the object of providing a sanitary fitting having improved safety features which is very simple to operate for the user.

To achieve this object the invention proposes a sanitary fitting comprising a cold water supply, a hot water supply, a mixer valve, more particularly a thermostat, including a flow control valve including a valve arranged in the cold water supply leading to the mixer valve, a valve arranged in the hot water supply leading to the mixer valve and a control element dictating the opening position of both valves in common. Further aspects of the invention read from the sub-claims.

By arranging the two valves in the direction of flow upstream of the mixer valve the risk of a crossflow is avoided. Using a single control element which dictates the opening position of both valves obviates the drawbacks as mentioned at the outset, requiring slip clutches to be provided.

In one aspect of the invention it may be provided for that the flow control valve is configured on one of several discharge conduits for distributing the mixed water leaving the mixer valve. A valve is then provided with which both the quantity of the water being discharged and the conduit from which it is flowing can be set.

In a special aspect it may be provided for that selecting several discharge conduits is done with the aid of the control element of the flow control valve. In this way a valve is provided which is made up of few parts and is thus also space-saving.

In yet a further special aspect it may be provided for that the fitting comprises as its operating element a control lever having two degrees of freedom in actuation. Thus, normally, i.e. when not wishing to change the temperature, the user needs to operate merely a single actuating element. Thus, also from the point of view of design considerations the fitting can be configured simpler. The two modes of actuation may be configured so that they can be clearly distinguished by the user, for example, by requiring turning for selecting and a shift perpendicular thereto for opening and closing.

In still a further special aspect it may be provided for that the flow control valve is configured as a kind of single-lever mixer valve. Such single-lever mixer valves are known and appreciated by the user. In this arrangement it may be provided for that the turning movement as usual on normal single-lever mixer valves for changing the temperature is now made use of, for instance, to select whilst the opening and closing movement is done in the same way as usual on single-lever mixer valves. As a result of this arrangement accidental malactivation is made impossible.

In accordance with the invention it may be provided for that the mixer valve and the flow control valve are accommodated in a common basebody of the fitting.

Again in accordance with the invention it may be provided for that each valve comprises an inlet port porting into a control surface area of a fixed control element. Arrangements of this kind are known in the case of single-lever mixer valves so that recourse can be made at least in part to known, readily available elements.

It may be provided for likewise that each valve comprises an outlet port porting into a control surface area of fixed control element.

Accordingly, the cold water to be controlled and the hot water to be controlled enter through the fixed control element into the flow control element and also out again.

In particular it may be provided for that the inlet port and/or outlet port is more or less closable by a control surface area of a movable control element. The two control elements are in full surface contact with each other and the movement of the movable control element occurs in the common contact surface area.

It may be provided for that a single fixed and/or movable control element is used in common for both valves. The ports for the two valves can be produced with high precision, the same as the movable control element, this being the reason why a precise control characteristic can be achieved with which both valves actually close simultaneously. Since there is also no shift against a stop in the shifting movement of the two control elements, no increased resistance would materialize even if the tuning failed to be precise.

In a further aspect in accordance with the invention it may be provided for that the mixed water conduit coming from the thermostatic valve ports into a port of a fixed control element, more particularly, the fixed control element common to both valves.

The control element into which the mixed water conduit ports may also comprise in a further aspect at least two outlet ports each of which leads via a separate water guide to a separate connection for a further conduit.

The connection between the inlet port of the mixed water conduit and the outlet ports may be producable, more particularly, likewise by a movable control element, preferably by the movable control element which also controls the two valves.

More particularly, the movable control element may comprise three separate water guides so that the three flow paths remain totally separated from each other.

Further features, details and benefits read from the claims worded with respect to the contents of the description, from the following description of a preferred embodiment of the invention as well as from the drawing in which:

as seen in FIG. 1 from above;

DETAILED DESCRIPTION

Figure 1:
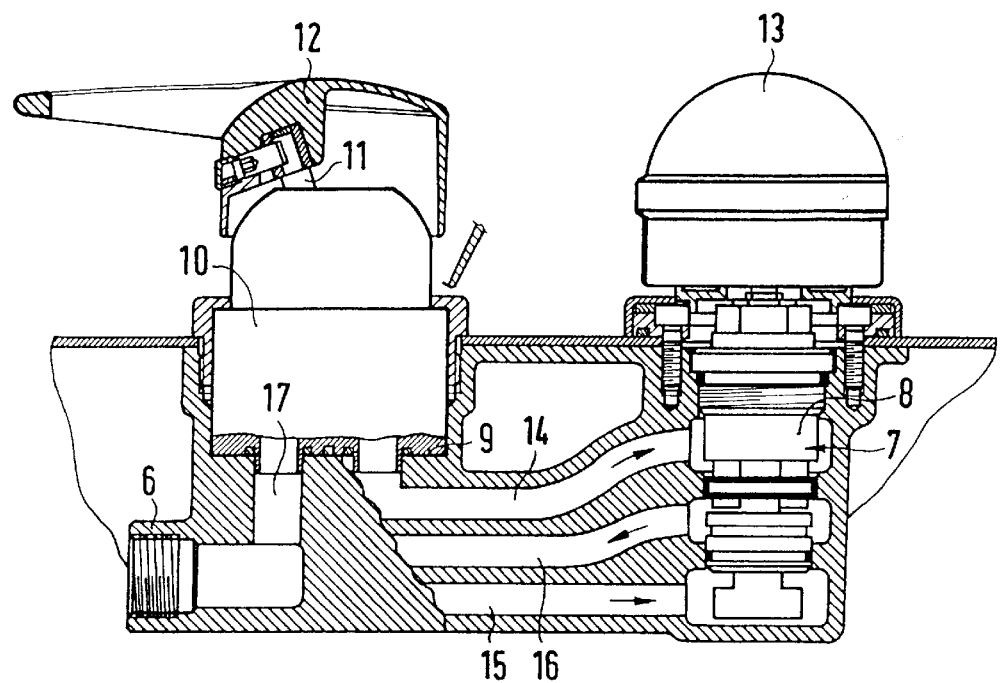
FIG. 1 is a longitudinal section through a sanitary fitting in accordance with the invention.
Figure 2:
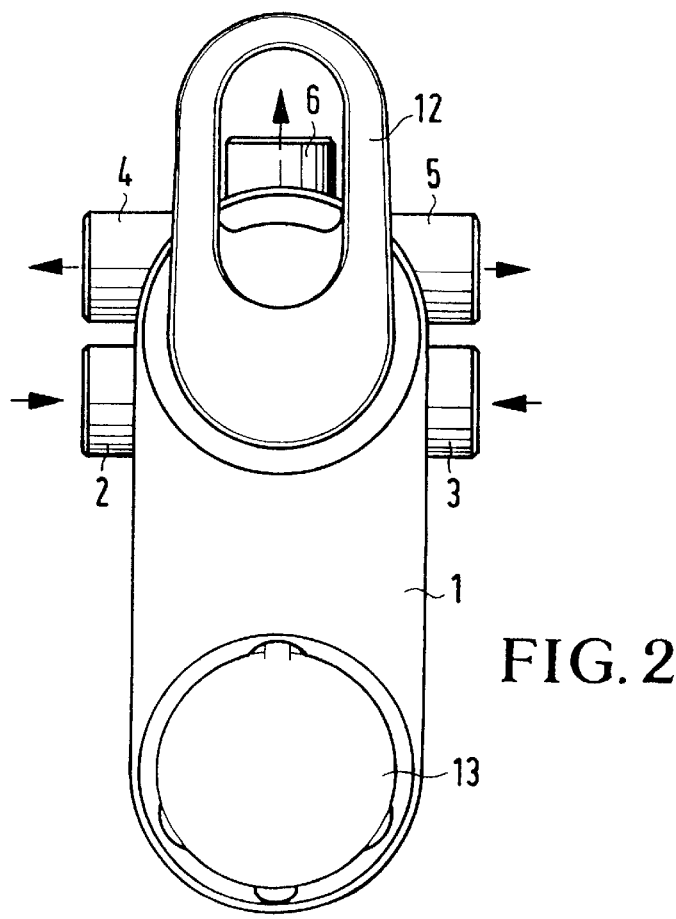
FIG. 2 is a front view of the fitting, i.e.

The sanitary fitting evident from FIG. 1 and FIG. 2 comprises a common basebody 1 of the fitting. This basebody 1 comprises a connection 2 for a hot water pipe and a connection 3 for the cold water pipe. The basebody of the fitting is installed so that the supplied hot and cold water gains access to the basebody 1 through the connections 2 and 3 respectively.

In the example illustrated, in addition to the two input connections 2, 3 the basebody contains three output connections, namely an output connection 4, for example, for a head shower, a connection 5 for a hand shower and a connection 6 arranged inbetween for a bathtub tap. The connection 6 for the bathtub tap is arranged as the normal tap in FIG. 2.

The basebody of the fitting contains a mount 7 for a thermostatic valve 8 and a second mount 9 for a valve cartridge 10 with the aid of which the water flow can be set. In its outer shape the valve cartridge 10 is configured similar to a single-lever mixer valve. Protruding from the cartridge for actuation is a spindle 11, to which a usual handle 12 is secured. The handle 12 can be swivelled about an axis oriented perpendicular to the plane of the drawing in FIG. 1 and turned about the axis of the spindle 11, these two modes of actuation being independent of each other.

A handle in the form of a rotary head 13 is likewise provided for the thermostatic valve 8, this head being set to a specific temperature by being turned.

Provided within the basebody 1 of the fitting are several passages guided such that the input connections 2, 3 are connected to the bottom surface area of the mount 9 via separate passages. Leading from the bottom surface area of the mount 9 to the thermostatic valve 8 is a passage 14 for hot water and a passage 15 for cold water, this thermostatic valve being known as such and therefore not described in more detail. Mixing the hot and cold water is done within the thermostatic valve. The mixed water leaves the thermostatic valve via a mixed water passage 16 which in turn leads to the bottom surface area of the mount 9 for the valve cartridge 10.

Separate passages then lead from the bottom surface area of the mounting space 9 to the individual output connections, one of these passages 17 as shown in FIG. 1 leading to the output connection 6 for the bathtub tap.

The valve cartridge 10 is configured so that it forms a separate valve for the cold water and a separate valve for the hot water, both valves being arranged upstream of the thermostatic valve 8 as viewed in the direction of flow. By more or less swivelling the actuating handle 12 the two valves are simultaneously opened or closed.

By turning the actuating handle 12 about an axis perpendicular to the plane of the drawing in FIG. 2 the mixed water is switched respectively to one of the three output connections. The neutral position as depicted in FIG. 2 switches the mixed water to the connection 6 which leads, for example, to the bathtub tap. If the handle 12 is turned clockwise, the hand shower is included in the circuit via connection 5, for example. Turning it counter-clockwise would then place the head shower in circuit via the connection 4.

Figure 4:
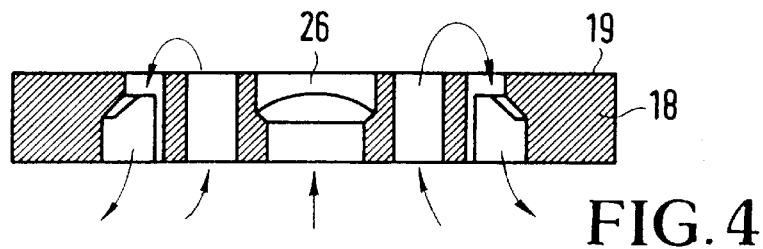
FIG. 4 is a cross-section through the fixed control disk as shown in FIG. 3.
Figure 3:
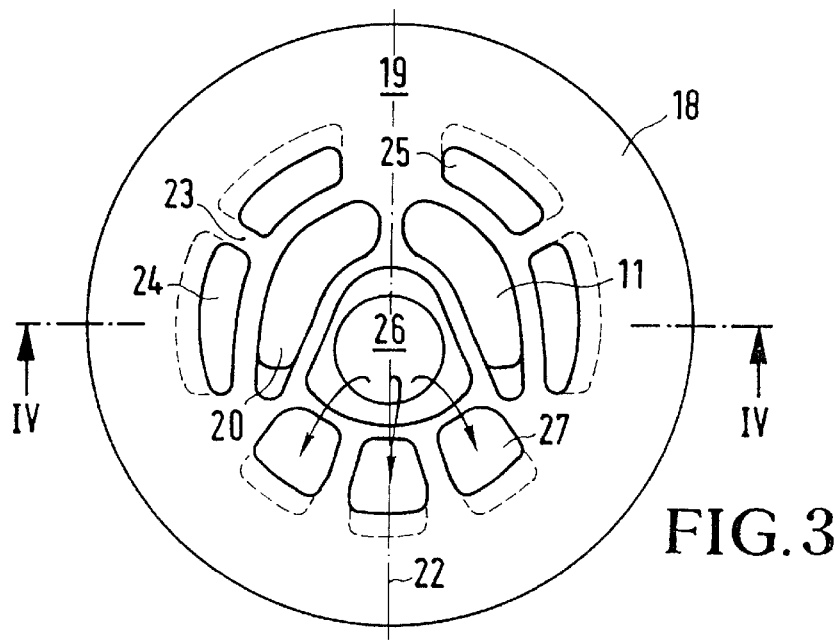
FIG. 3 is a view from above on the control surface area of the fixed control disk.

One of the possibilities of how the valve may be configured is illustrated in FIGS. 3 to 6. The flow control valve, containing the valve cartridge 10, is configured as a kind of single-lever mixer valve, it thus containing, for example, incorporated in the cartridge a fixed control disk 18 sealingly connected by its one side—this being the underside as shown in FIG. 4—to the corresponding aforementioned passages. The control disk may be made, for instance, of a ceramics material so that the control surface area 19 evident from FIG. 3 and arranged at the top in FIG. 4 is configured very smooth. The control disk 18 comprises several cut-outs porting into the control surface area 19, one inlet port 20 being provided for hot water and one port 21 for the cold water inlet being provided. Both ports are arranged and configured mirror-symmetrical about the centerline 22 drawn dot-dashed. The two inlet ports 20, 21 extend more or less curved about a centerpoint. Provided practically concentrically to these two ports 20, 21 are the further ports, namely an outlet port 24 interrupted by a web 23 for the hot water and an outlet port 25 for the cold water. The webs 23 serve to reinforce the plate without being of any significance to the function.

In addition to the inlet and outlet ports for the water flowing to the thermostatic valve the fixed control disk also contains a central port 26 which is connected to the mixed water passage 16, the mixed water entering the control surface area from the port 26 porting into the control surface area 19.

Configured adjacent to the inlet port 26 for the mixed water in the control disk 18 are three outlet ports 27 for the mixed water, each of which is connected to a separate outlet passage 17.

Figures 5, 6:
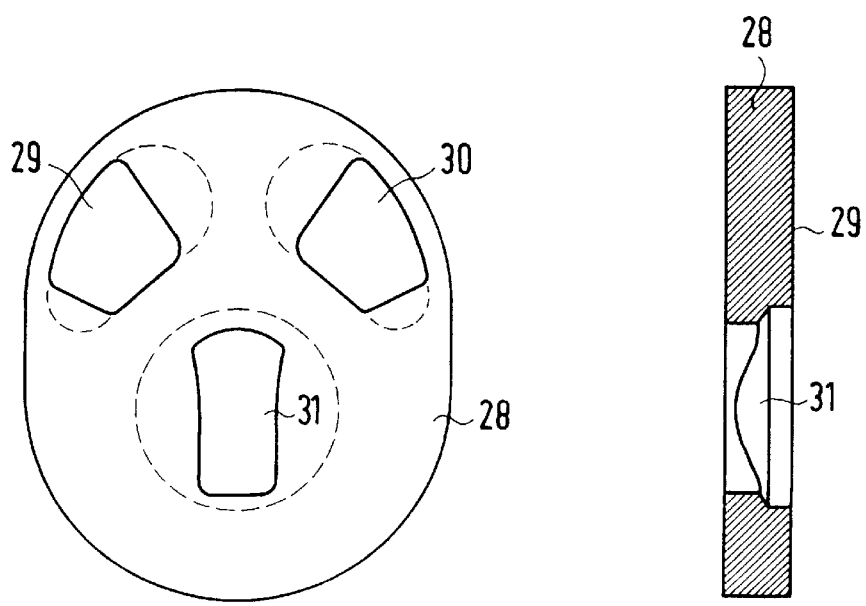
FIG. 5 is a view from above on the movable control disk belonging to the fixed control disk as shown in FIG. 3.
FIG. 6 is a longitudinal section through the movable control disk as shown in FIG. 5.

FIG. 5 is a view from above of the movable control disk 28 assigned to the fixed control disk 18 in the same direction, i.e. from the side opposite to the control surface area of the movable control disk 28.

The control surface area 29 is the right-hand underside of the movable control disk 28 as shown in FIG. 6 in contact with the control surface area 19. The movable control disk 28 comprises three separate cut-outs 29, 30 and 31. Located on the upper side of the movable control disk 28 as evident from FIG. 5 in the assembled condition is a cover plate which separates the individual cut-outs 29 to 31 from each other. The cut-out 29 which is then closed off relative to the upper side serves to make and break a connection between the inlet port 20 and the outlet ports 24, whilst the cut-out 30 is responsible for the ports 21 and 25.

The third cut-out 21 serves to produce a connection between the port 26 and one of the outlet ports 27 in each case.

For simultaneously more or less opening the inlet valves leading to the thermostatic valve the disk 28 is shifted in its own longitudinal direction, this disk being turned for selecting the mixed water to the individual outlets. The ports are arranged so that a turn does not result in a change in the flow, whilst independent of the angular position of the movable control disk 28 any shift in the longitudinal direction always results in a consistent opening and closing movement of the inlet valves.

The description of the example embodiment relates to a disk valve. However, the invention may be achieved not only with the aid of disk valves, instead all kinds of valves may be employed in which a control element can be moved with two degrees of freedom, for example, plunger valves and ball valves. In the case of plunger valves the barrel is the fixed control element and the the movable plunger is the movable control element.

Instead of a thermostat capable of operating mechanically or electronically, a mixer valve could also be provided, for example, a mixer valve with which the temperature can be set.

More particularly the mixer valve may be combined with a pressure-compensating valve.

We claim:

1. A sanitary fitting comprising a cold water supply, a hot water supply, a mixer valve, a thermostat, including a flow control valve including a valve arranged in the cold water supply leading to the mixer valve, a valve arranged in the hot water supply leading to the mixer valve and a control element dictating the opening position of both valves in common, each valve having an inlet port and an outlet port porting into a control surface area of a fixed control element in each case, and at least one of said inlet port and said outlet port is closable by a control surface area of a control element movable in a common contact surface area, wherein said movable control element comprises three separate water guides.

2. The sanitary fitting as set forth in claim 1, wherein said flow control valve is configured to distribute mixed water leaving said mixer valve to at least one outlet conduit.

3. The sanitary fitting as set forth in claim 2, wherein selection between the hot water supply and cold water supply is done with the aid of said control element of said flow control valve.

4. The sanitary fitting as set forth in claim 1, wherein said fitting comprises a control lever actuatable in at least one actuating mode as the actuating member.

5. The sanitary fitting as set forth in claim 2, wherein said flow control valve is configured as a single-lever mixer valve.

6. The sanitary fitting as set forth in claim 1, wherein said mixer valve and said flow control valve are accommodated in a common basebody of the fitting.

7. The sanitary fitting as set forth in claim 1, wherein each valve comprises an outlet port porting into a control surface area of a fixed control element in each case.

8. The sanitary fitting as set forth in claim 1, comprising at least one of a fixed and movable control element in common for both valves.

9. The sanitary fitting as set forth in claim 8, wherein said mixed water conduit comes from said thermostat ports into a port of a fixed control element.

10. The sanitary fitting as set forth in claim 9, wherein said fixed control element comprises at least two outlet ports, each of which is connected to an outlet connection.

11. The sanitary fitting as set forth in claim 10, wherein the connection between said inlet port for the mixed water and said outlet ports is producable by a movable control element.

12. The sanitary fitting as set forth in claim 9, wherein said control element assigned to said mixed water conduit is said control element assigned to said inlet valves.

13. The sanitary fitting as set forth in claim 1, wherein said control elements are the control elements of a plunger valve.

14. The sanitary fitting as set forth in claim 1, wherein said control elements are the control elements of a ball valve.

15. The sanitary fitting as set forth in claim 1, wherein said control elements are the control elements of a disk valve.

* * * * *